United States Patent
Cane et al.

(10) Patent No.: US 6,629,110 B2
(45) Date of Patent: Sep. 30, 2003

(54) ADMINISTRATION OF A DIFFERENTIAL BACKUP SYSTEM IN A CLIENT-SERVER ENVIRONMENT

(75) Inventors: David A. Cane, Cambridge, MA (US); Jonathan F. Freidin, Marblehead, MA (US); Troy Runkel, Franklin, MA (US); Philip A. Speare, Arlington, MA (US); Lev Vaitzblit, Concord, MA (US); Wayne Babich, Chelmsford, MA (US); Leonid Filatov, Sudbury, MA (US); Chad Council, Worcester, MA (US)

(73) Assignee: Connected Corporation, Natick, MA (US)

( * ) Notice: Subject to any disclaimer, the term of this patent is extended or adjusted under 35 U.S.C. 154(b) by 317 days.

(21) Appl. No.: 09/757,823

(22) Filed: Jan. 10, 2001

(65) Prior Publication Data

US 2001/0034737 A1 Oct. 25, 2001

Related U.S. Application Data

(60) Provisional application No. 60/175,285, filed on Jan. 10, 2000.

(51) Int. Cl.[7] ............................................... G06F 17/30
(52) U.S. Cl. ........................... 707/204; 707/202; 707/1; 709/219; 709/209; 711/162; 714/4
(58) Field of Search ................................. 707/201, 202, 707/10, 1; 709/204, 219; 711/162; 714/4

(56) References Cited

U.S. PATENT DOCUMENTS

| | | | | |
|---|---|---|---|---|
| 4,686,620 A | * | 8/1987 | Ng | 707/10 |
| 5,043,871 A | | 8/1991 | Nishigaki et al. | 364/200 |
| 5,522,037 A | * | 5/1996 | Kitagawa et al. | 714/40 |
| 5,634,052 A | | 5/1997 | Morris | 395/601 |
| 5,765,173 A | * | 6/1998 | Cane et al. | 707/204 |
| 5,778,395 A | * | 7/1998 | Whiting et al. | 707/204 |
| 5,813,017 A | | 9/1998 | Morris | 707/204 |
| 5,940,507 A | * | 8/1999 | Cane et al. | 713/165 |
| 6,101,507 A | * | 8/2000 | Cane et al. | 707/204 |
| 6,141,773 A | * | 10/2000 | St. Pierre et al. | 714/20 |
| 6,157,931 A | * | 12/2000 | Cane et al. | 707/204 |
| 6,233,589 B1 | * | 5/2001 | Balcha et al. | 707/203 |
| 6,269,381 B1 | * | 7/2001 | St. Pierre et al. | 707/202 |
| 6,366,986 B1 | * | 4/2002 | St. Pierre et al. | 711/162 |
| 6,374,250 B2 | * | 4/2002 | Ajtai et al. | 707/101 |
| 6,385,706 B1 | * | 5/2002 | Ofek et al. | 711/162 |
| 6,397,308 B1 | * | 5/2002 | Ofek et al. | 711/162 |
| 6,460,054 B1 | * | 10/2002 | Grummon | 707/204 |
| 6,487,561 B1 | * | 11/2002 | Ofek et al. | 707/204 |
| 2001/0034737 A1 | * | 10/2001 | Cane et al. | 707/204 |
| 2002/0049778 A1 | * | 4/2002 | Bell et al. | 707/200 |
| 2002/0059505 A1 | * | 5/2002 | St. Pierre et al. | 711/162 |

* cited by examiner

*Primary Examiner*—Jean M. Corrielus
(74) *Attorney, Agent, or Firm*—Weingarten, Schurgin, Gagnebin & Lebovici LLP

(57) ABSTRACT

A method for the administration of a differential file backup system in a client-server system is disclosed in which the various component files that comprise a backup file are read from a first memory device of the file backup system to a second memory device and processed by the server. The server processes the various file components, or archive files in which the various file components reside, to reduce the number of access points across the first memory device to enhance the efficiency of the file retrieval, file reconstruction, and file restore operations of the backup file system.

35 Claims, 12 Drawing Sheets

ADMINISTRATION OF A DIFFERENTIAL BACKUP SYSTEM IN A CLIENT-SERVER ENVIRONMENT

CROSS REFERENCE TO RELATED APPLICATIONS

This application claims priority under 35 U.S.C. §119(e) to provisional patent application Ser. No. 60/175,285 filed Jan. 10, 2000; the disclosure of which is incorporated by reference.

STATEMENT REGARDING FEDERALLY SPONSORED RESEARCH OR DEVELOPMENT

N/A

BACKGROUND OF THE INVENTION

This application relates generally to file backup systems and more particularly to the administration of a differential file backup system in a client-server environment.

Client-server network systems are well known and widely used in many industries and for many applications. In a typical client-server system, a user operating a client machine sends data to one or more central computers, the server, for processing. The processed data may be stored locally on the client or centrally on the server. In either case, a single point failure, i.e., the failure of the primary data storage system, whether on the client or on the server, can result in a catastrophic loss of data. To prevent this loss of data due to a single point failure, a file backup system is commonly employed to allow recovery of the client data.

Traditional file backup systems perform a full backup of a file designated to be backed and then save full backup versions of that file only when changes had been made to it. These systems require large amounts of storage space and over time, the storage requirements became untenable. Differential backup systems provided an improvement in the amount of storage required over time by not repeating a full backup of a file after the initial save of the file. In these systems only the changes, i.e., the differential between the original file and the new file, are saved. In this way, a file can be reconstructed by combining the various components of the file that include the initial file fully saved(the base) and the plurality of differential files (the delta files). This incremental approach to backup file systems can reduce the backup time, and the storage requirements for the overall system.

Differential or incremental backup file systems do have a few problems associated with their operation. First, differential backup systems are not as robust as full file backup systems. Second, a large number of old versions of a file can accumulate within the backup storage device occupying potentially valuable storage space and increasing the recovery time. Third, differential file backups received over a long period of time can result in the fragmentation of the various file components over the media, and in the case of tape backup system, the file components may be distributed across several different tapes.

It would therefore be desirable to be able to back up files in such a way that the file components are contained on a small number of tapes and that the data is processed to allow a file backup system to reclaim storage space by processing the file components.

BRIEF SUMMARY OF THE INVENTION

A method for administrating a differential file backup system in a client-server environment is disclosed. In one embodiment, the method includes reducing the number of access points associated with the components of a file that has been stored on the file backup system that include a base file and at least one delta file. A server reads data from a first memory device used by the file backup system. The data includes the base file and the at least one delta file of a backup file of interest and writes the data to a second memory device. The server then processes the data contained in the second memory device to reduce the number of access points the components of the backup file have across the first memory device.

In one aspect of the invention, the files that comprise the placements of the components of the backup file of interest are reconfigured so that the component files are adjacent to one another when written to the first memory device after processing. In another aspect the component files of the backup file of interest are grouped according to the date of the last modification of the file.

In another embodiment of the present invention, a subset of the component files that include the base file and one or more delta files are coalesced together to form a new base file. In one aspect of this embodiment, the files are selected according to one or more file expiration rules. In another aspect, the subset of files are selected according to the number of delta files that exist after the last base file was created. In another aspect, the server determines the size of the files that are to be coalesced together and estimates the size of the new base file after coalescing. The coalescing operation will only be performed if the difference between the two sizes is greater than a predetermined value.

In another embodiment of the present invention the server detects if a coalesced file contains corrupted data and requesting that the appropriate client retransmit an uncorrupted copy of the file to the server.

In another embodiment, the files to be backed up are further stored in archive files that are written to the first memory device of the file backup system. The archive files are processed to reduce the number of access points relative to a backup file of interest by reading the archive files from the first memory device of the file backup system, and writing the archive files to a second memory device. The server rearranges the archive files that contain components of the backup file to be adjacent when written back to the first memory device. In another aspect, the component files within the archive files can be rearranged so that files that have not been modified recently are grouped together and files that have recently been modified are grouped together.

In another embodiment, the server selects a backup file of interest and reads the components from the first memory device of the backup system to the second memory device. The server reconstructs the backup file of interest and detects if the reconstruction of the backup file fails. In the event of the failure to reconstruct the backup file, the server requests that the client retransmit the most recent version of the file corresponding to the backup file of interest. The server receives the retransmitted file and stores that version, and deletes the corrupted file.

In another embodiment, the server selects a backup file of interest and reads the components from the first memory device of the backup system to the second memory device. The server reconstructs the backup file of interest and detects if the reconstruction of the backup file fails. In the event of the failure to reconstruct the backup file, the server requests that a mirror server transmit an uncorrupted version of the backup file of interest. The server receives the retransmitted file and stores that version, and deletes the corrupted file.

BRIEF DESCRIPTION OF THE SEVERAL VIEWS OF THE DRAWING

The invention will be more fully understood by reference to the following Detailed Description of the Invention in conjunction with the Drawing of which.

DETAILED DESCRIPTION OF THE INVENTION

Figure 1:
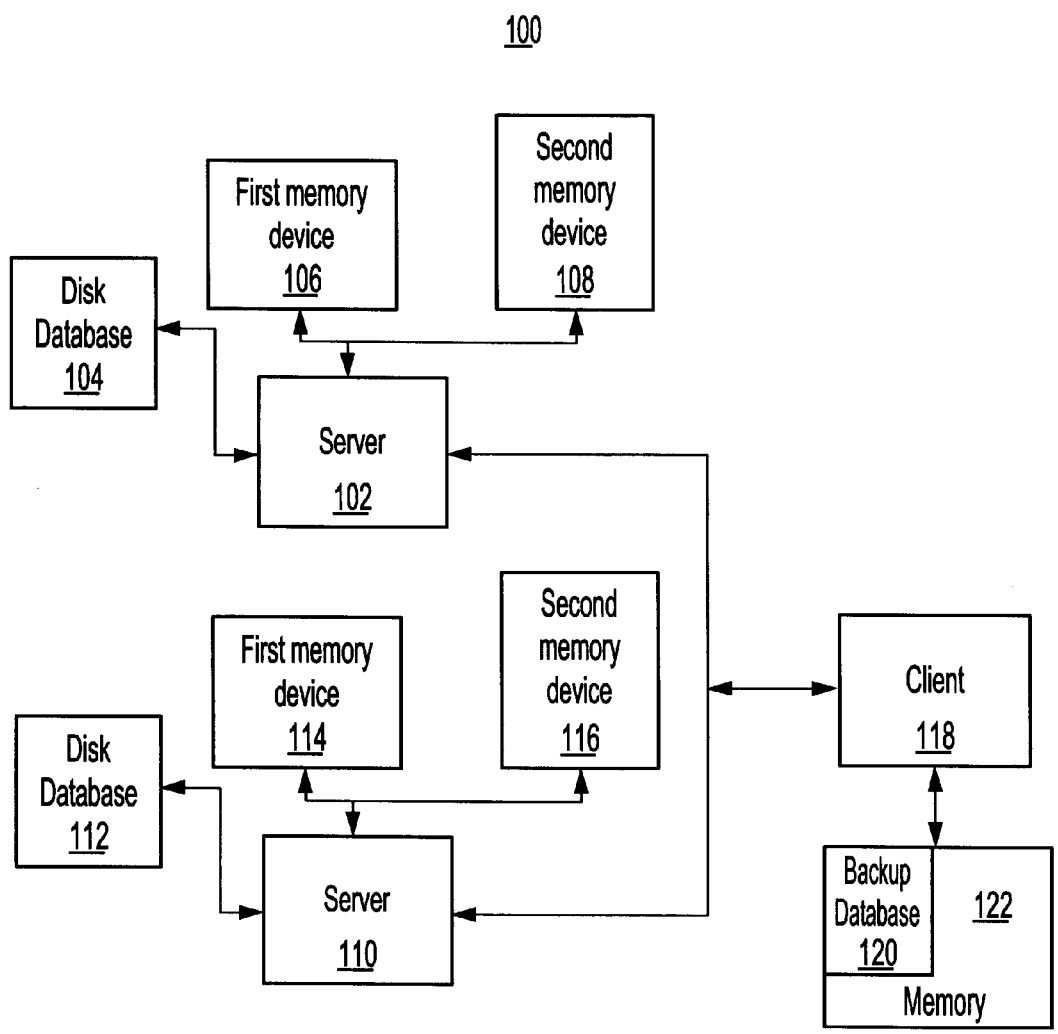
FIG. 1 is a block diagram of the present invention.

A method and system in accordance with the present invention for administrating a differential file backup system is disclosed. As illustrated in FIG. 1 a user (not shown) operates a client machine 118. The client 118 includes a memory 122 used to store client data and a backup database 120. The client 118 is coupled to a pair of servers 102 and 110 which are also coupled together. The servers 102 and 110 both include a first memory device 106 and 114 respectively for storing backup file data, a second memory device 108 and 116 respectively for storing data to be processed by the server, and a disk database 104 and 112 respectively for storing data that is associated with the backup file data.

The client 118 provides file data to the servers 102 and 110 that is marked for backup storage in a differential backup system. A differential backup system stores the entire file on the first save, and only the incremental or differential changes to the file in subsequent backup operations. In this way, the components of a file backed up on the system will include the entire original file (the base file) and a plurality of incremental or differential change files (the delta files). Any type of file may be backed up using a differential backup system, for example and without limitation, executable files, data files, word processing file, spreadsheet files, image files, document files, and other files containing data may be backed up in this way.

In the system illustrated in FIG. 1, one of the servers 102 or 110 is selected as the main backup site for the data storage, and the other server is selected to be a mirror site. The mirror site stores the same file backup data as the main site, and therefore provides a second backup of the backup data. This "backup of the backup data" increases the robustness of the overall system by preventing a single point failure in the first memory device 104 associated with the primary server 102 from destroying a user's data. In the illustrated embodiment server 102 is arbitrarily selected as the main site and the server 110 is selected as the mirror site. It is also possible to provide the administration of a differential file backup system according to the present invention using only one server without the use of the mirror site.

The server 102 receives the file data marked for archival backup storage from the client 118 and processes this data to determine if the file has been stored before. If the file has not been stored, the server 102 will store the entire file on the first memory device 106 and provide a copy of the entire file to the mirror server 110. The mirror server 110 also stores the entire file on the first memory device 114 associated therewith. Both of the servers 102 and 110 update the appropriate disk database 104 and 112 respectively.

If the file has been previously stored, only the incremental differential changes will be stored on the first memory device 106 by the server 102. The server 102 provides the differential change data to the server 110 to store on the first memory device 114. Both of the servers 102 and 110 will then update the appropriate disk database 104 and 112 respectively.

Figure 2A:
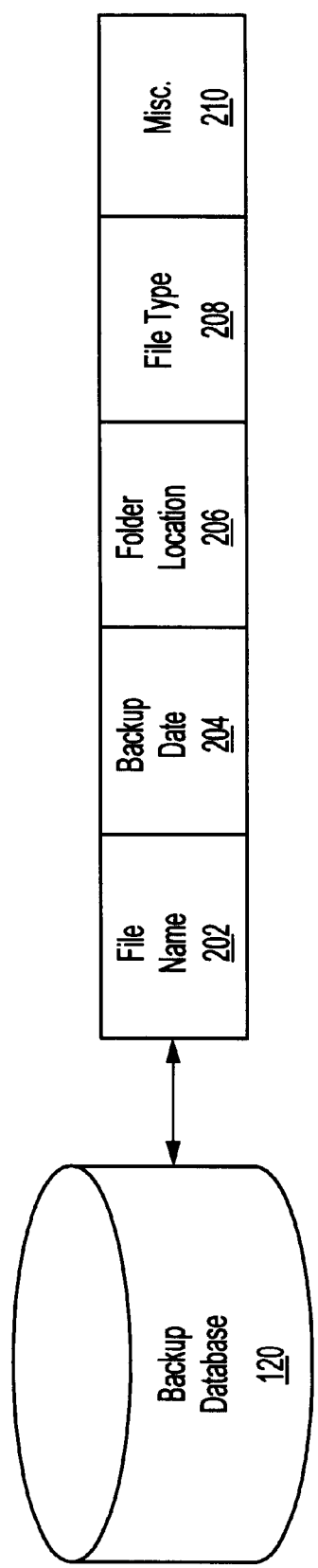
FIG. 2A is a schematic diagram of the data stored in the backup database of FIG. 1.
Figure 2B:
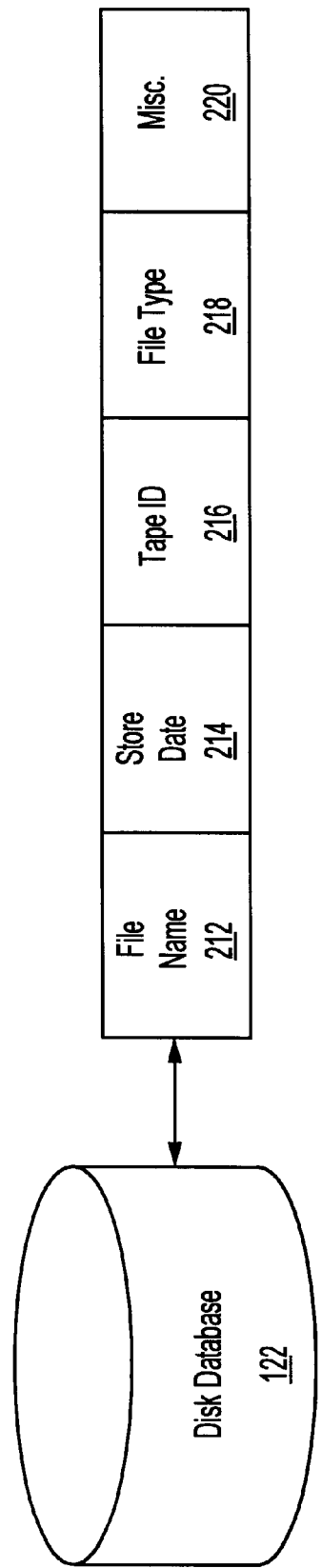
FIG. 2B is a schematic diagram of the data stored in the disk database of FIG. 1.

As discussed above, each of the two servers 102 and 110 maintain disk databases 104 and 112 respectively that are associated with the backup file data stored on the first memory device 104 and 112 respectively. FIG. 2B illustrates the type of data that may be collected and maintained within the disk databases 102 and 112 that corresponds to specific files stored therein. The data may include the file name 212, the date the file was stored 214, the tape identifier 216, the file type 218, and miscellaneous data 220. This data is maintained separately by each server and, as will be explained in more detail below, can be utilized to provide to resynchronize the file backup data stored on the main server 102 and the mirror server 110. This ensures that each backup system contains the same data. If, as discussed below, an archive file is used to store the data then an additional column of data will be needed to identify the particular archive file.

Similarly, the client 118 maintains a backup database 120 that corresponds to the file data provided to the server 102 to be backed up. As illustrated in FIG. 2A, the backup database 120 may contain the file name 202, the date of the last backup 204, the folder location 206 in the client memory 122, the file type 208 and miscellaneous data 210. As will be explained below, the server may request from the client data relating to a previously backed up file to provide for resynchronization between the client 118 and the server 102. If, as discussed below, an archive file is used to store the data then an additional column of data will be needed to identify the particular archive file.

The first memory devices 106 and 114 are typically used to provide backup file storage for the servers and the clients coupled to them. In one embodiment, the first memory devices 106 and 114 are both high speed streaming tape backup systems. These tape systems are designed to efficiently have data read and written serially from and to the server at a high data rate. Streaming tape backup systems however, are not efficient at finding the data located on the tape. Having to start and stop the tape repeatedly to search for, find, and read/write the proper data decreases the efficiency of the overall process. Each point on the tape that marks the beginning of a portion of the tape containing some of the desired data is called an access point for that particular data or file. Thus, minimizing the number of access points necessary to retrieve the data contained in the various file components of the backup file of interest will increase the overall efficiency of the differential file backup system. Alternatively, the first memory device could be a read/write optical disk system, or hard disk drive as well.

In addition, manipulating data on the first memory device can have high latency, both as a result of mounting and unmounting units of media into tape drives, as well as positioning the portions of the tape that is needed at the read/write heads. As such, as part of the present invention before manipulating the data stored on the first memory device, it is read and written to the second memory device that is typically faster and able to access the data randomly and not serially as does the first memory device. The second memory device may be RAM, or a disk drive such as a hard disk or floppy, a read/write optical disk, or other memory device. In this way, a large amount of data that contains not only the files of interest but other files that may be of interest as well may be read from the first memory device and written to the second device without a time penalty. After the necessary processing, which may include operating on many different backup data files, the processed data is re-written to the first memory device. In a preferred embodiment, a new tape is used to store the newly processed data, with the old tape being stored and eventually recycled.

Alternatively, the method of the present invention may also be performed on a file backup system utilizing a single memory device such as a hard disk drive or a read-writeable optical drive. In this embodiment, the data is not transferred from one disk drive to another, rather all processing takes place on data stored on the single drive.

Figure 11:
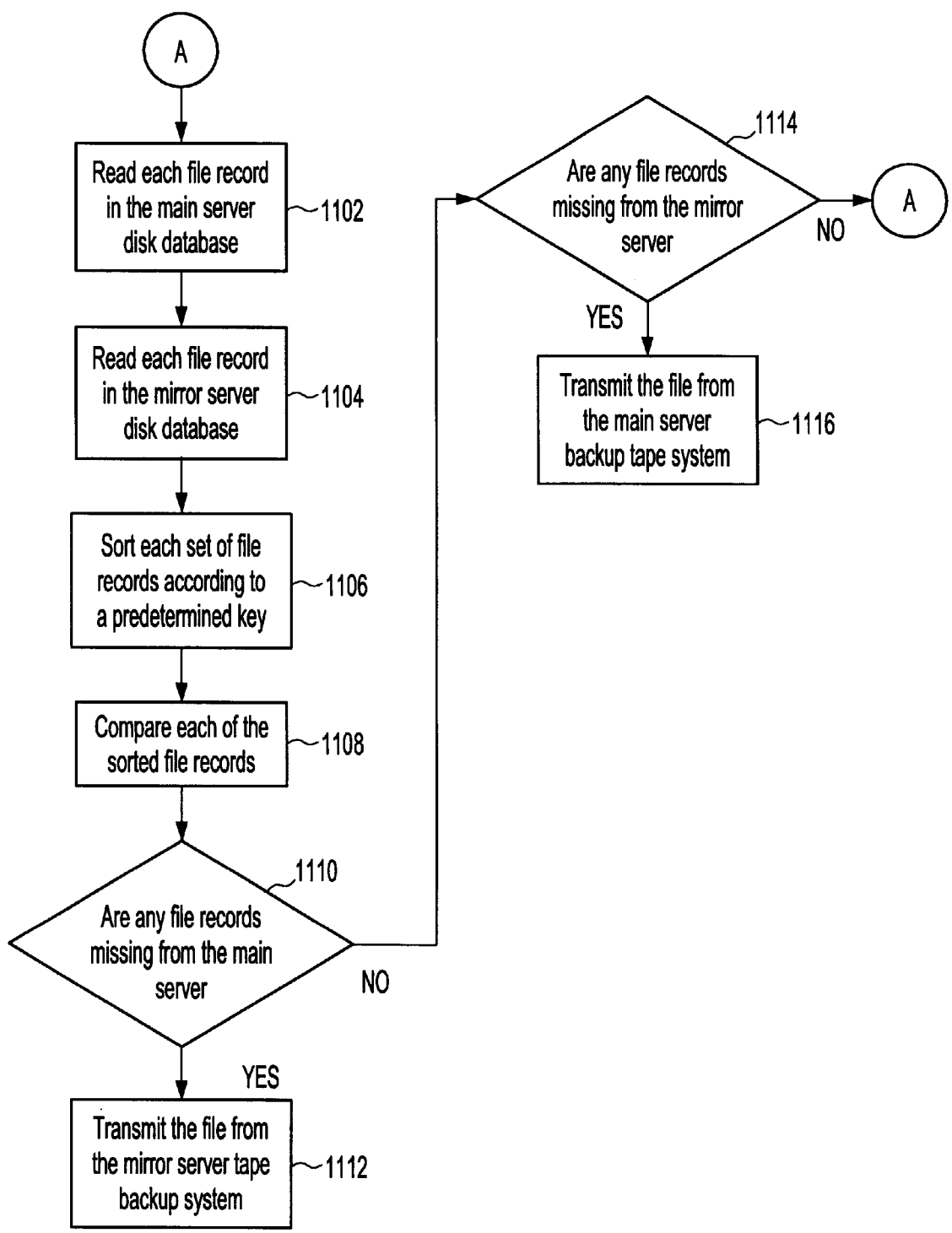
FIG. 11 is a flowchart illustrating a method of server to server resynchronization in accordance with the present invention.

In the embodiment in which a mirror server is utilized hardware errors or other problems may occur between the two servers resulting in a loss of synchronization between the data stored thereon. FIG. 11 illustrates a method 1100 that synchronizes the data stored in each backup file system with the other. As illustrated in step 1102, each record in the disk database 104 is read by server 102. As illustrated in step 1104, each record in the file database 112 is read by the server 110. These two sets of records are sorted according to a predetermined key, as illustrated in step 1106. These two lists of records are compared, as illustrated in step 1108. If any files are missing from the main server, control is passed to step 1112, as illustrated in step 1110, and the mirror server is requested to transmit the file to the main server as illustrated in step 1112. If any files are missing from the mirror server, control is passed to step 1116, as illustrated in step 1114, and the main server is requested to transmit the file to the mirror server as illustrated in step 1116. In a preferred embodiment, this server to server resynchronization is performed on a regular periodic basis and may be performed prior to any of the operations described below.

In some instances, it would be advantageous to store one or more files in a super file, also referred to as an archive file. The data itself, or blocks of files storing data in the archive files can be compressed or otherwise processed to ensure that a minimum of storage space is used to store the data contained therein. In an alternative embodiment, the method of FIG. 11 may be modified to be performed on a system utilizing archive files. A. In this instance in step 1102 the main server reads each archive stored thereon and in step 1104, the mirror server reads each archive stored thereon. In step 1106 the list of archives are sorted according to a predetermined key, and in step 1108 the two sorted lists are compared. If any archive files are missing from the main server, control is passed to step 1112, as illustrated in step 1110, and the mirror server is requested to transmit the archive file to the main server as illustrated in step 1112. If any files are missing from the mirror server, control is passed to step 1116, as illustrated in step 1114, and the main server is requested to transmit the missing archive file to the mirror server as illustrated in step 1116. In a preferred embodiment, this server to server resynchronization is performed on a regular periodic basis and may be performed prior to any of the operations described below.

Figure 9A:
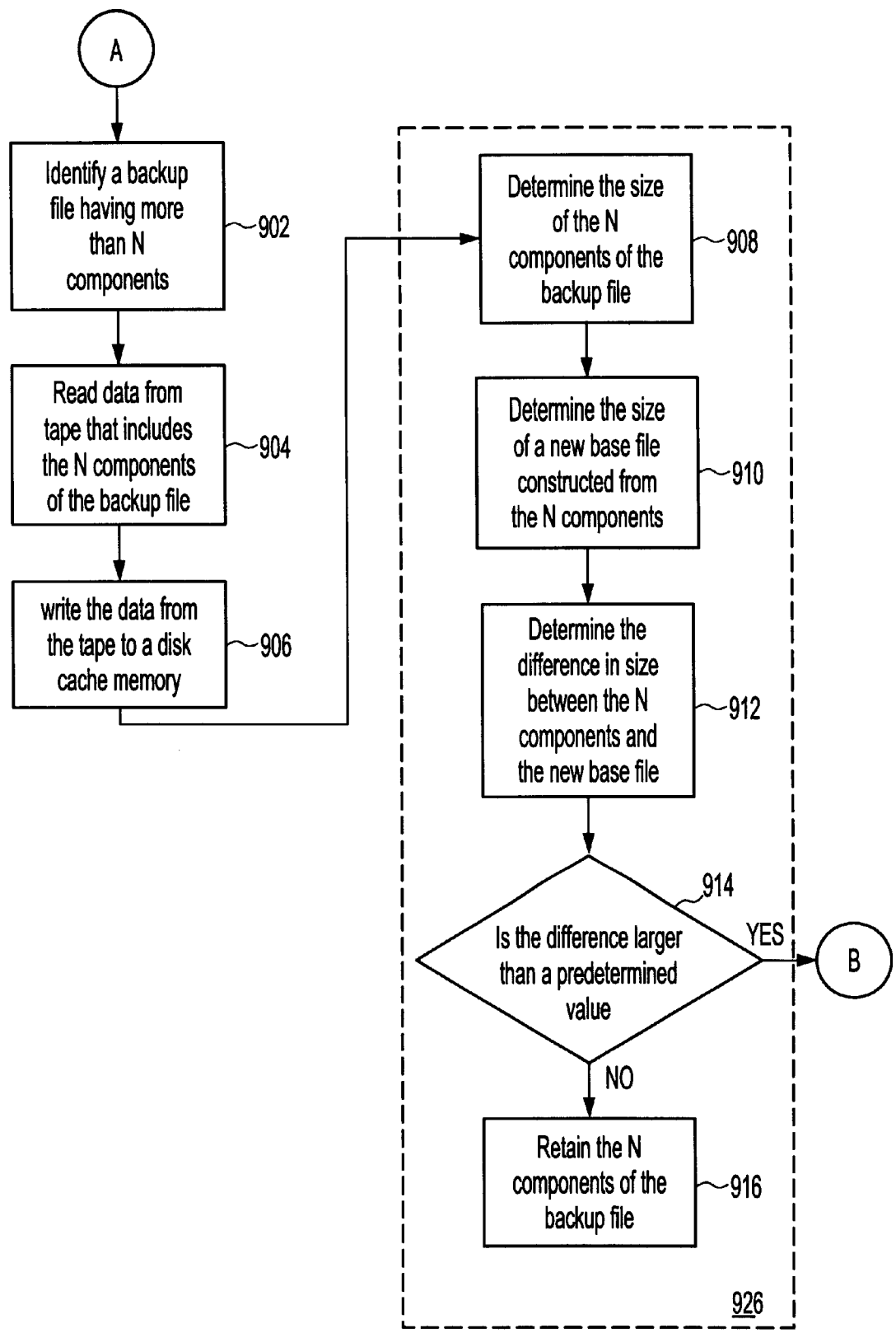
FIGS. 9A and 9B is a flowchart illustrating a method of rebasing the component files of a backup file in accordance with the present invention.
Figures 9B, 10:
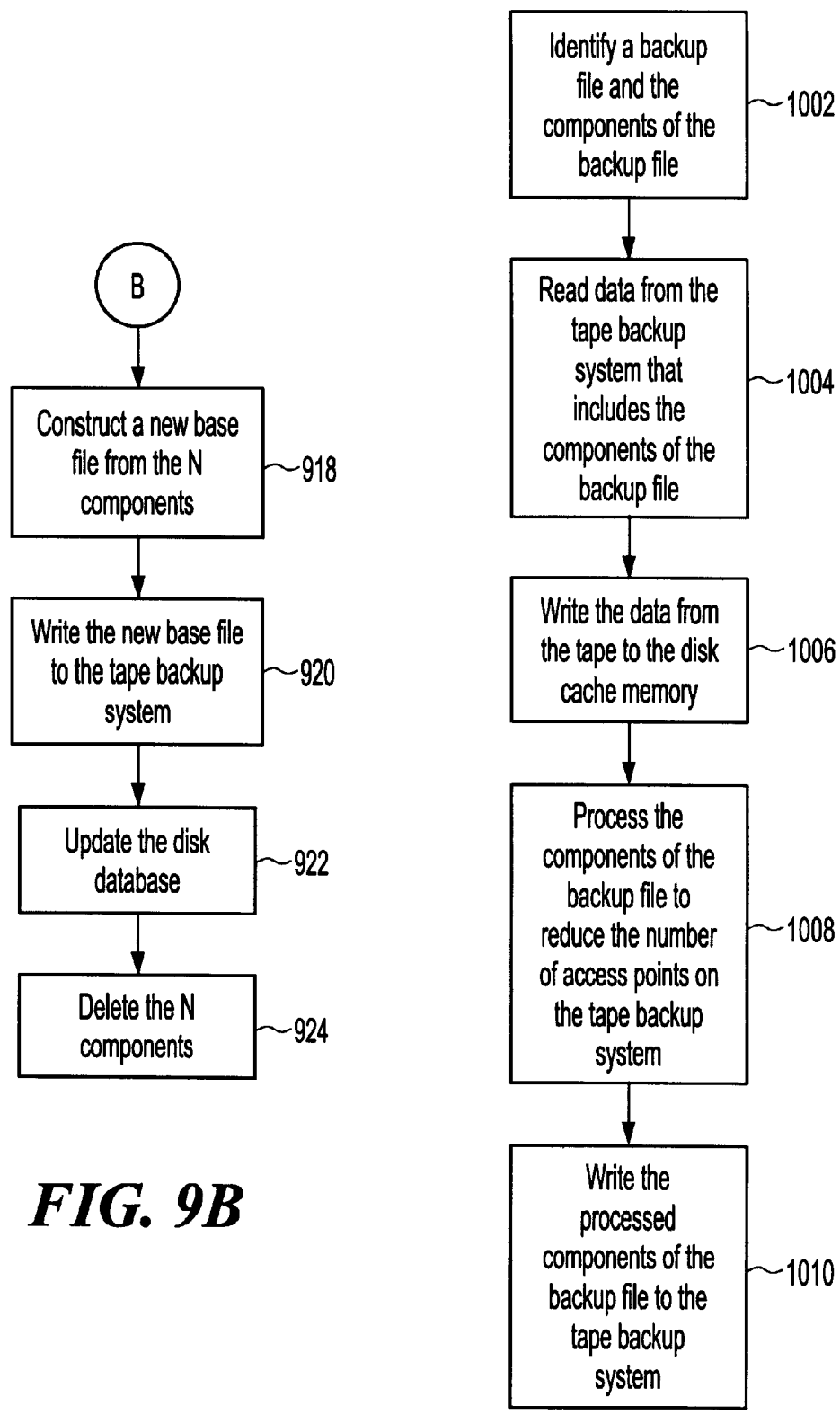
FIG. 10 is a flowchart illustrating a method of defragmenting the component files of a backup file in accordance with the present invention.

FIG. 10 illustrates a method for reducing the number of access points for a differential backup system. As illustrated in step 1002 the server identifies the backup file of interest and the component files of that particular backup file. Data is read from the first memory device that includes at least the component files of the backup file of interest, as illustrated in step 1004. This data is written to the second memory device, as illustrated in step 1006, and processed by the server as illustrated in step 1008. The processed data is then rewritten to the first memory device as illustrated in step 1010.

Figure 3:
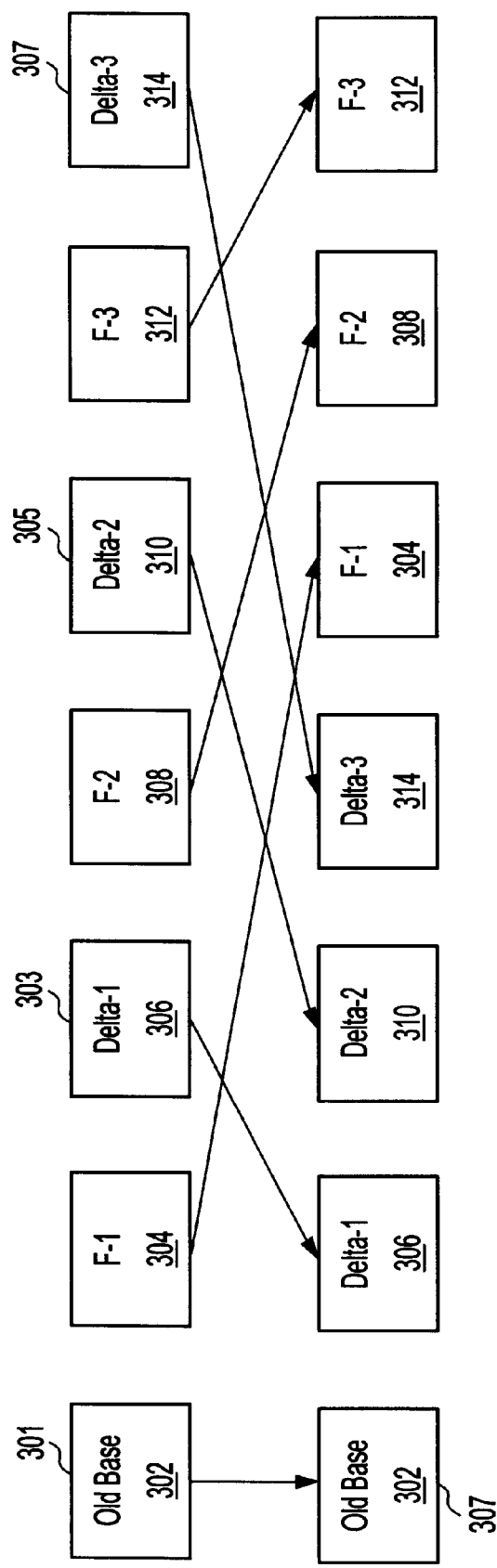
FIG. 3 is a schematic representation of a method for defragmenting the component files of a backup file in accordance with the present invention.

FIG. 3 schematically illustrates one method of processing the component files in accordance with the present invention to minimize the number of access points for a differential backup file storage system. In the illustrated embodiment, files 302, 306, 310 and 314 are the various components of a backed up file. File 302 is the base file, the first instance in which the file was saved, and files 306, 310, and 314 contain delta files associated with the base file that represent the various changes made to the base file in file 302 over a given time period. As illustrated in FIG. 3, because the file components are separate from one another, there are four (4) access points 301, 303, 305, and 307 respectively for the entire backup file. Thus, a tape backup system would have to reposition itself four (4) times in order to access the necessary component file data. By defragmenting the various file component files, that is, placing the various component files adjacent to one another, the files can be re-ordered such that there is only one access point 309. These method steps described above are illustrated in FIG. 10. In addition other possible arrangements of files may be used as well. For example, depending on other constraints grouping the various component files into more than one group may still yield a significant reduction in the number of access points. If for example in the embodiment illustrated in FIG. 3, two groups of the component files were formed, there would still be a reduction in the number of access points by 50%.

Figure 4:
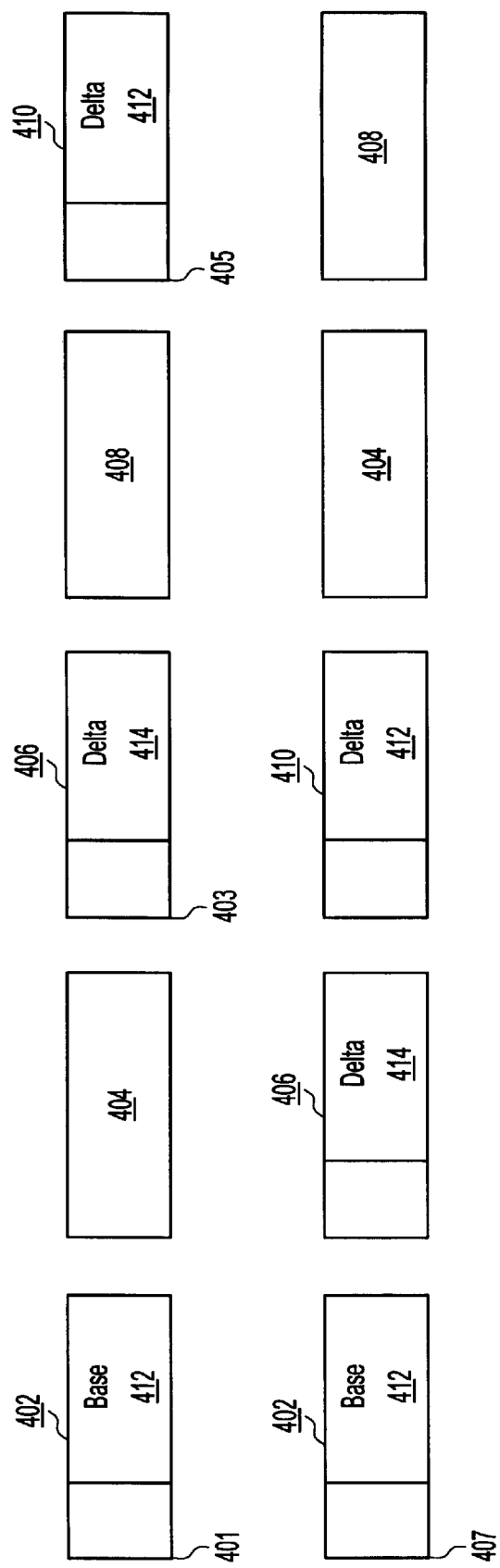
FIG. 4 is a schematic representation of a method for defragmenting the component files of a backup file stored within archive files in accordance with the present invention.

In an alternative embodiment utilizing archive files illustrated in FIG. 4, the archive files containing the component files of the backup file, and not the component files themselves, are rearranged so that the various file components are contained in adjacent archives that may be read into the second memory device for processing. As illustrated in FIG. 4, the archives 402, 406, and 410 contain the various components of the backup file of interest, that is, the base file 412, and the delta files 414 and 416. Before the rearranging of the archive files, there are three (3) access points 401, 403, and 405. After rearranging, there is only one access point 407. The method steps corresponding to the above description are illustrated in FIG. 10.

In another embodiment, the files within the archive files are rearranged such that files that are more likely to be changed or less likely to be changed are grouped together in separate archives. If an archive file has only one or two files that are needed, reading, processing, and rewriting the data within the archive file and the archive file itself is not an efficient use of the server. In this embodiment, the various files are grouped together based on the date of the last delta or incremental change file. Thus, backup files that have recently had delta files added to the differential backup storage system will be grouped in one set of archives, and backup files that have not been changed for a given period of time will be grouped in another set of archives.

In addition to rearranging the various component files or archive files, other methods may be used to minimize the number of access points associated with each backup file that has been stored on the backup system and also to reduce the amount of storage required for each of the component files of each backup file stored thereon.

In some instances, the archive files will be created by the particular client and transmitted to the server. These archive files may be received and stored in the first memory device of the backup system over a period of weeks, months, or years. Thus, the archive files for a particular account may be spread across, and many tapes or optical disks. In this case, the archive files contain the files for particular accounts and the processing of the archive files will be to reduce the number of access points for the entire account across the first memory device. In this embodiment, the archive files will be read from the first memory device into the second memory device and processed such that the archive files are grouped according to the particular account.

Figure 5:
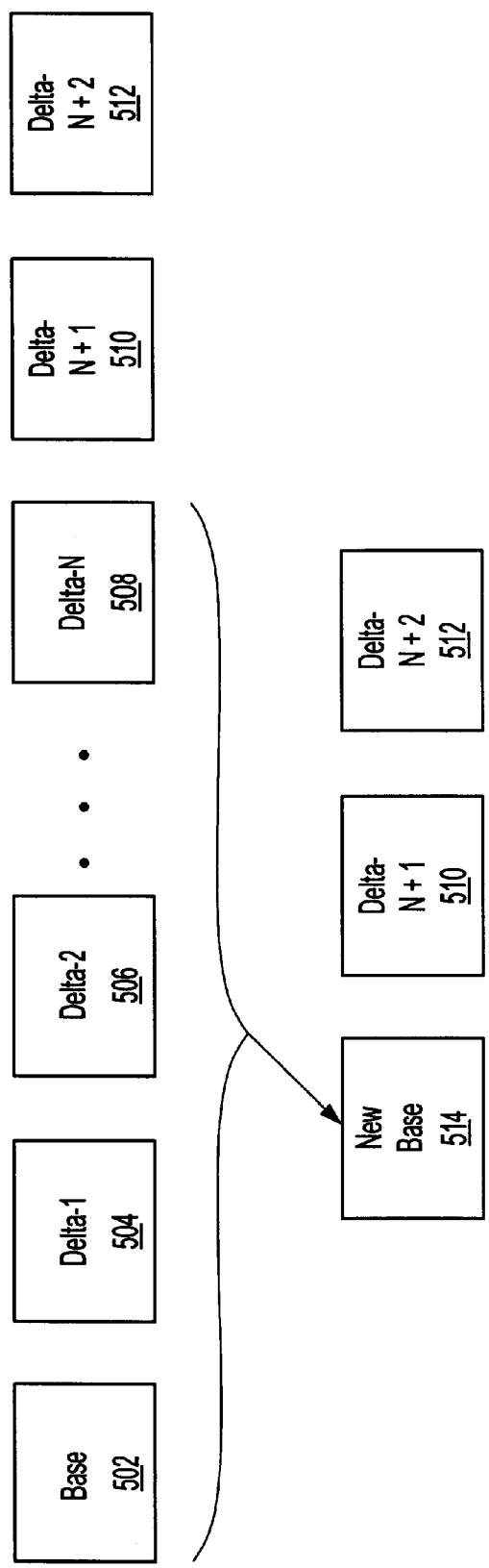
FIG. 5 is a schematic representation of a method for rebasing the component files of a backup file in accordance with the present invention.

As schematically illustrated in FIG. 5 and illustrated in FIGS. 9A and 9B, another method for reducing the number of access points that is referred to as "Nth level rebasing" is provided. The server uses the disk data database to identify backup file data that contains more than a predetermined number of components (N components). Data is read from the backup system that includes at least the N components of the backup file(s) of interest into the disk cache and onto the second memory device 116, as illustrated in steps 902–906. In one embodiment, control is passed to step 918 and as illustrated in FIG. 5, the base file 502 and the next N delta files, 504, 506, and 508 are coalesced into a single new base file 514. The new base file 514 and any other delta files 510 and 512 are then written to the second memory device and ultimately rewritten to the first memory device. As illustrated in FIG. 9 the steps 918–924 provide for the server to update the disk database, as illustrated in step 918, delete the N component files, as illustrated in step 920. The new base file is written to the first memory device, as illustrated in step 924.

In this manner, even if the backup files have not been defragmented as described above, the number of access points has been decreased by coalescing the base and the next N delta files into a new base. Typical values for N may be 50, 75, or 100.

Nth level rebasing is a very resource intensive operation. Thus, the small gains in reducing the storage size of the backup file may not justify the cost necessary to perform the operations in terms of server availability. In a preferred embodiment, optimization routine 926 can be provided to further optimize the Nth level rebasing operations. As illustrated in step 908, the server determines the aggregate size of the N components of the backup file of interest that are to be coalesced together. As illustrated in step 910 the server estimates the size of the new base file after coalescing the N component files together. The difference between the two sizes is determined, as illustrated in step 912, and if the difference is larger than a predetermined value, as illustrated in step 914, the process continues and control passes to step 918. If the difference is not larger than a predetermined value, then as illustrated in step 914, the N components are retained without coalescing, as illustrated in step 916.

It should be noted that Nth level rebasing may also be performed on files stored within one or more archive files as described above. After the necessary archive files have been identified as containing the necessary components of the backup file(s) of interest, the identified archive files are read from the first memory device and written to the second memory device. The processing of the various file components then takes place as described above. New archive files are formed and the processed files and the retained files that were not purged are included therein. The new archive file(s) are re-written to the second memory device and to the first memory device as described above.

In an alternative embodiment, the present invention may be applied to a backup file system using only a single memory device such as a hard disk drive. In this embodiment, Nth level rebasing of files is used to reclaim memory and to further optimize the file reconstruction process and may be performed as described above and illustrated in FIG. 9 but beginning at step 906 and continuing through the illustrated method, except that at step 920 the new base file will be written to the single memory device. The same comments made above for the optimization process of file purging for a two memory device system apply to file purging for a single memory device system.

It may be also advantageous to reclaim space by purging files from the system. The files to be purged may be selected according to various criteria. For example, a client computer may not longer be in use, certain files or file types may be stored for only a finite time, or only a fixed number of older versions of a file may be stored on the server. For example, in one embodiment, Table 1 illustrates various expiration rules that may be used to purge files

TABLE 1

| RULE | Time files are kept on a system with two memory devices | Time files are kept on a system when there is only a single memory device |
|---|---|---|
| Client cancelled account | 60 days | 60 days |
| Files deleted on client | 180 days | 90 days |
| Files of type .pst | 30 days | 30 days |
| Old versions of files | 90 days | 45 days |
| Old versions of files | 20 versions | 10 versions |

Figure 6:
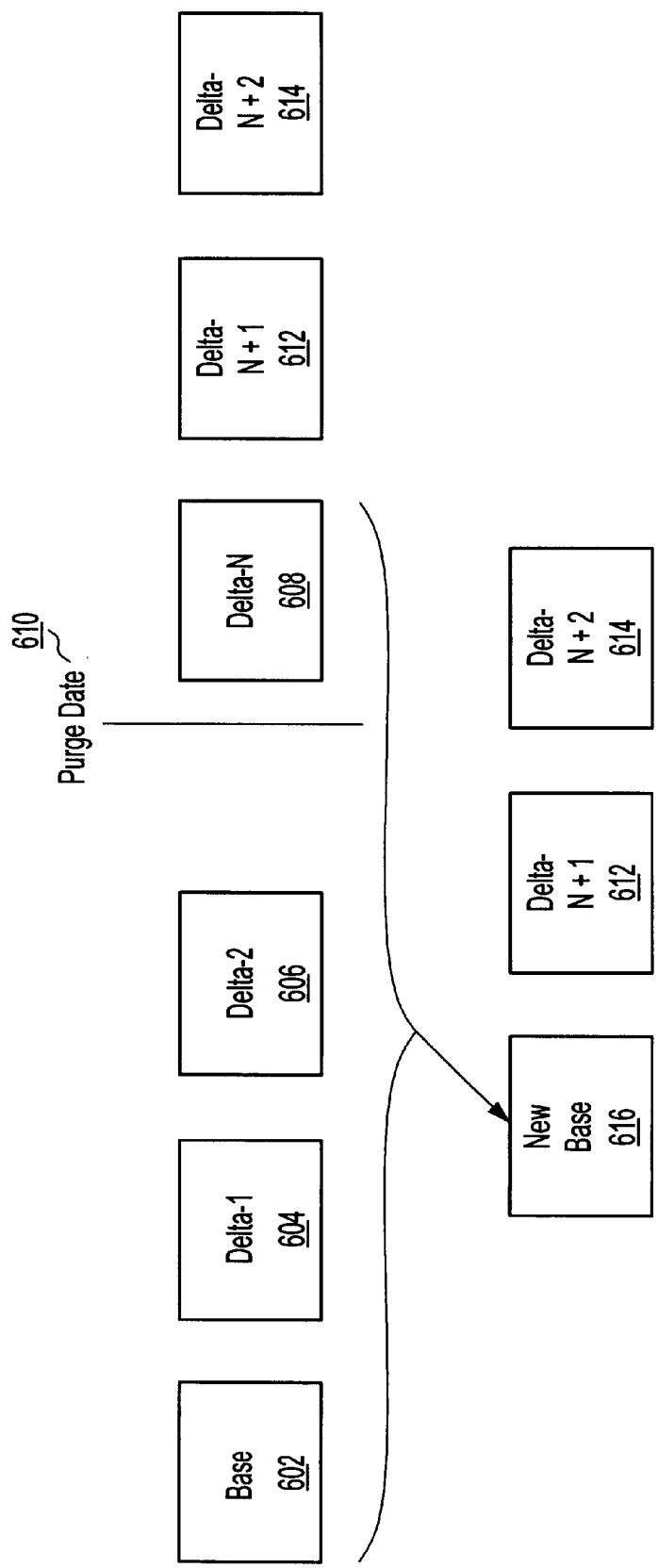
FIG. 6 is a schematic representation of a method for purging the component files of a backup file in accordance with the present invention.
Figure 8A:
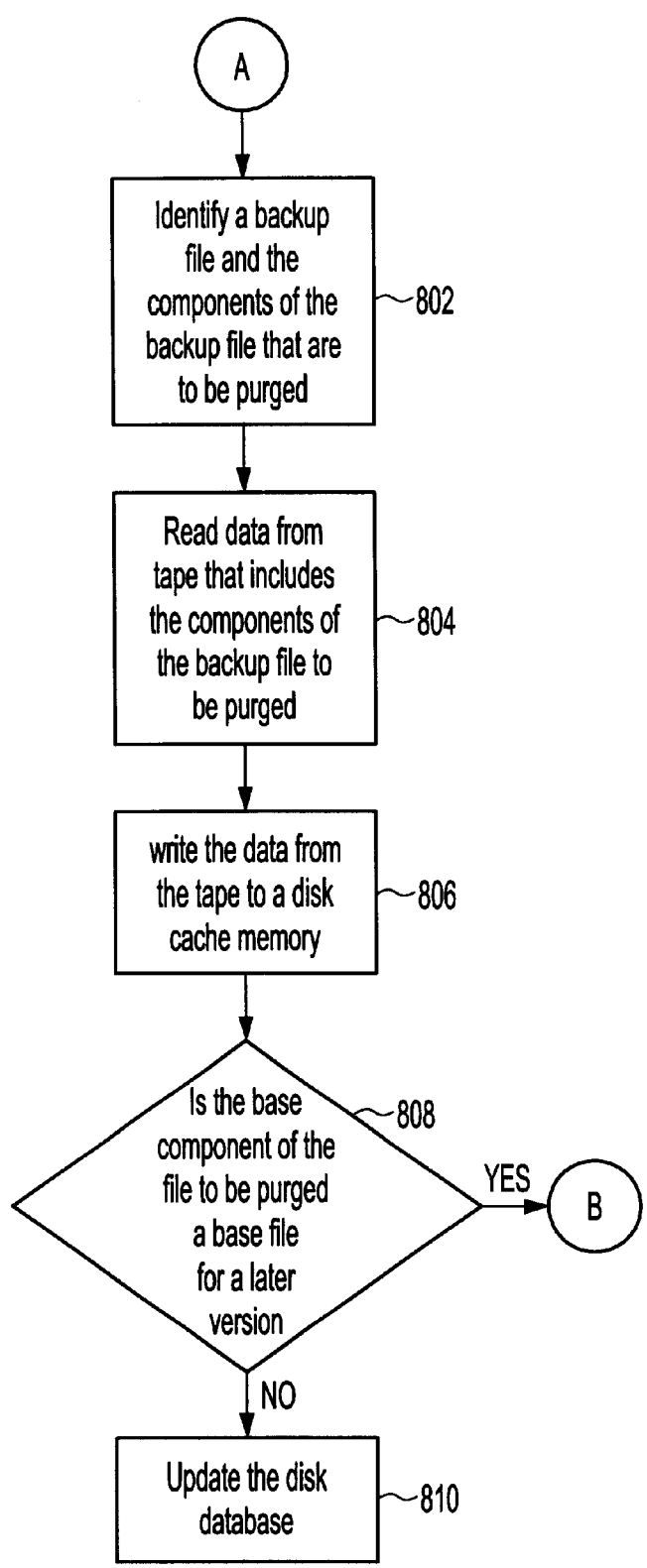
FIGS. 8A–8C are a flowchart illustrating a method of purging the component files of a backup file in accordance with the present invention.
Figures 8B, 8C:
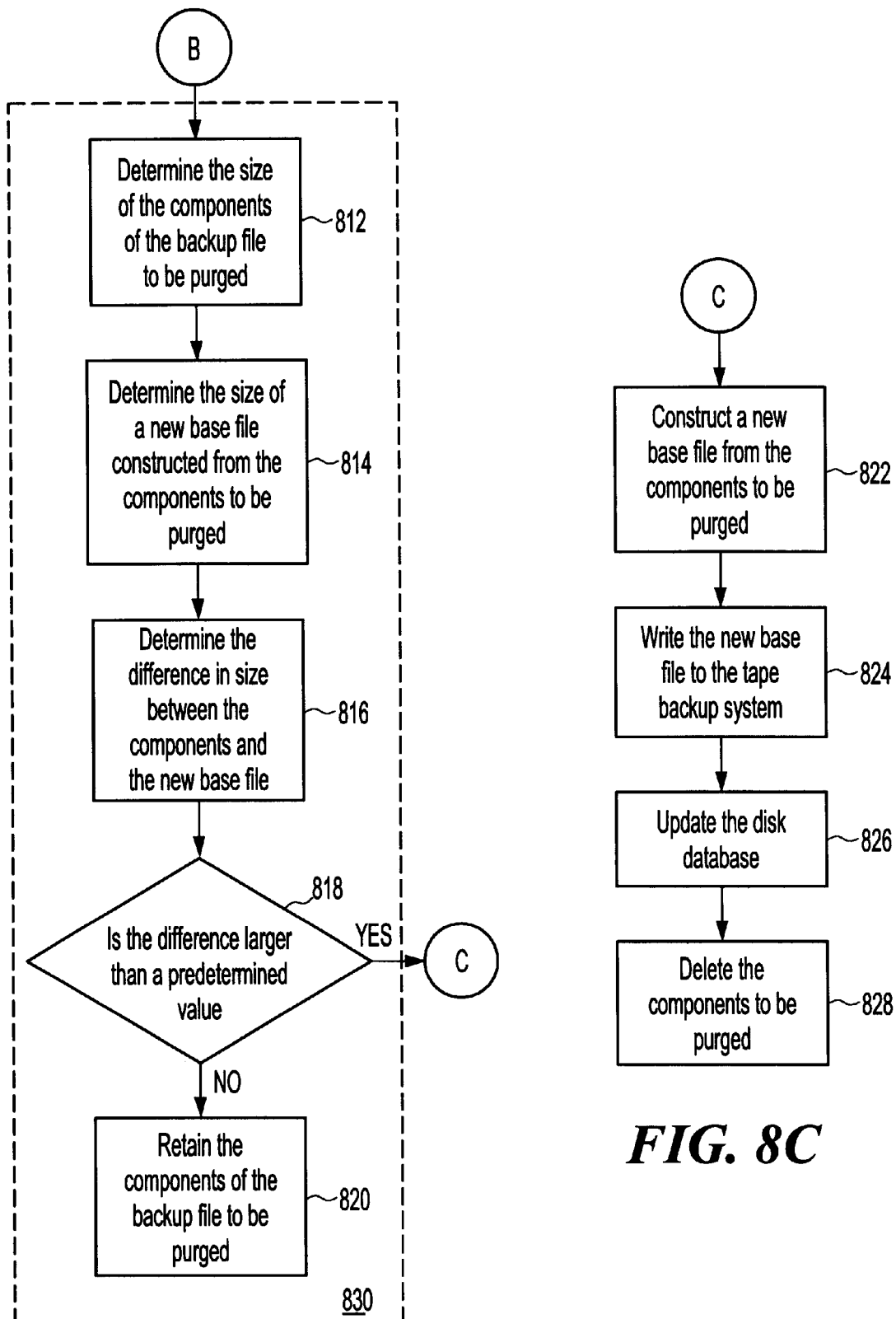

As schematically illustrated in FIG. 6 and illustrated in FIGS. 8A–8C a method of purging files is disclosed. The server uses the disk data database to identify backup file data that should be purged according to plurality of expiration rules. Data is read from the backup system that includes the identified backup file(s) of interest into the disk cache and onto the second memory device 116, as illustrated in steps 802–806. The server determines if the file to be purged is needed as part of a base file for a later version, as illustrated in step 808. If the file is not needed as part of a base file for a later version, as illustrated in step 810, then the file is deleted.

If the file is needed as part of a base file for a later version of the backup file, a new base is constructed from the various components that are to be purged and the next delta file by coalescing these files together and constructing a new base file, as illustrated in step 822 and also in FIG. 6. In particular, base file 602 and delta files 604, 606, and 608 are coalesced into a new base file 616 having delta files 612 and 614 associated therewith. The server updates the disk database, as illustrated in step 824, the files to be purged are then deleted, as illustrated in step 826. The new base file is written to the first memory device, as illustrated in step 828.

File purging can be a very resource intensive operation. Thus, the small gains in reducing the storage size of the backup file may not justify the cost necessary to perform the operations in terms of server availability. In a preferred embodiment, optimization routine 830 can be provided to further optimize the file purging operations. As illustrated in step 812, the server determines the aggregate size of the file components of the backup file of interest that are to be purged. As illustrated in step 814 the server estimates the size of the new base file after coalescing the N component files together. The difference between the two sizes is determined, as illustrated in step 816, and if the difference is larger than a predetermined value, as illustrated in step 818, the process continues and control passes to step 822. If the difference is not larger than a predetermined value, then as illustrated in step 816, the file components of the backup file are retained without purging, as illustrated in step 820.

It should be noted that file purging may also be performed on files stored within archive files that have been described above. After the necessary archive files have been identified as containing the necessary backup file components, the identified archive files are read from the first memory device and written to the second memory device. The processing of the various file components then takes place as described above. New archive files are formed and the processed files and the retained files that were not purged are included therein. The new archive file(s) are re-written to the second memory device and to the first memory device as described above.

In an alternative embodiment, the present invention may be applied to a backup file system using only a single memory device such as a hard disk drive. In this embodiment, purging files to reclaim memory and to further optimize the file reconstruction process may be performed as described above and illustrated in FIG. 8 but beginning at step 806 and continuing through the subsequent steps of the illustrated method, except that at step 824, the data would be written to the single memory device. The same comments made above for the optimization process of file purging for a two memory device system apply to file purging for a single memory device system.

Figure 7A:
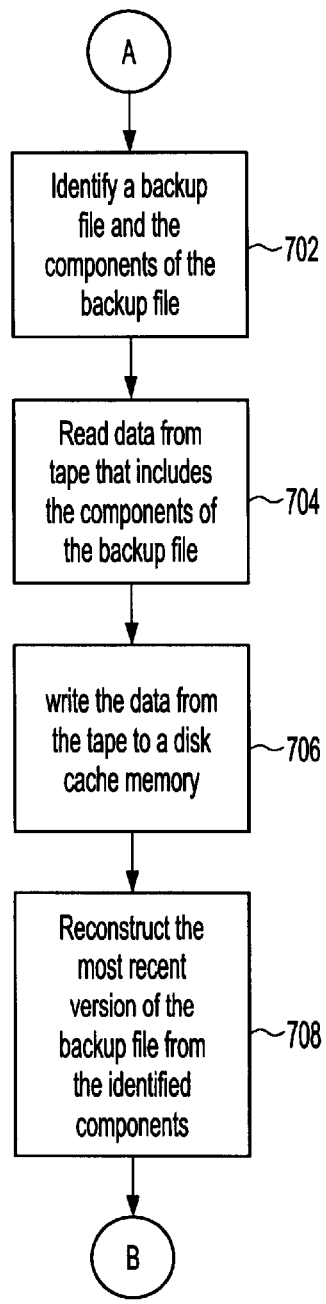
FIGS. 7A–7C are a flowchart illustrating a method of self-healing a differential backup file system in accordance with the present invention.
Figure 7B:
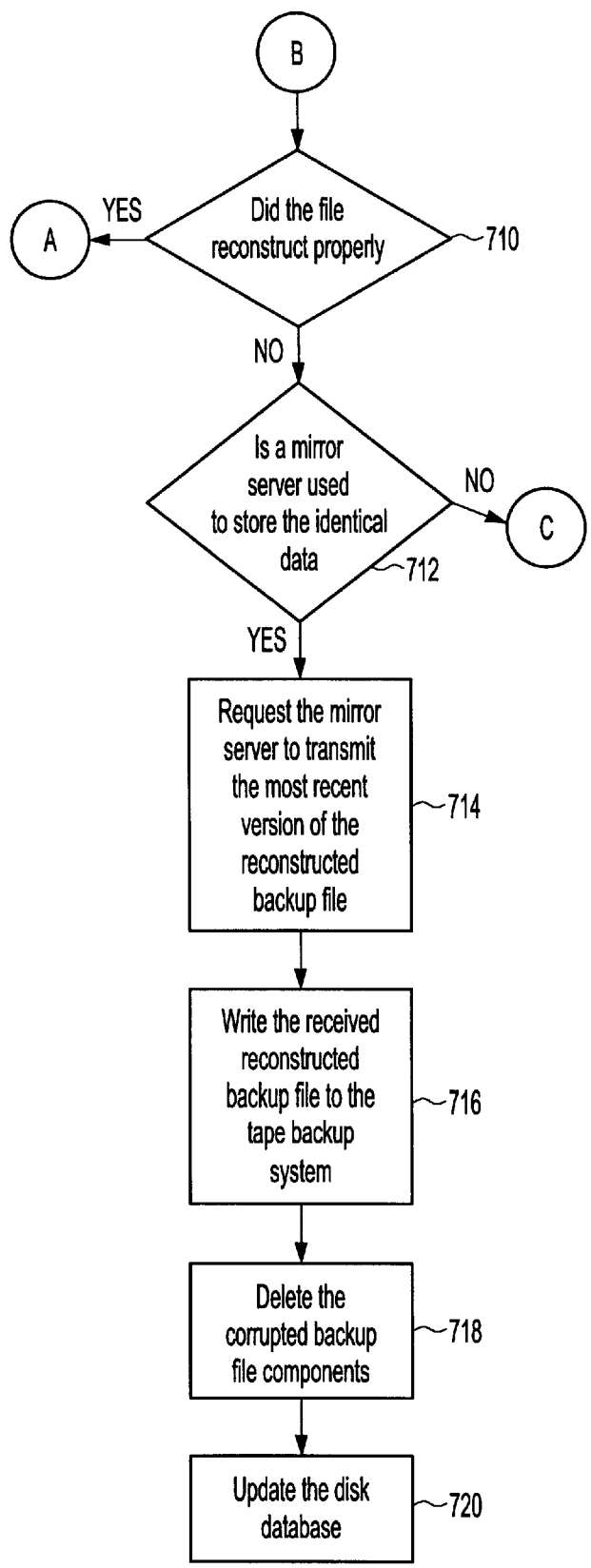
Figure 7C:
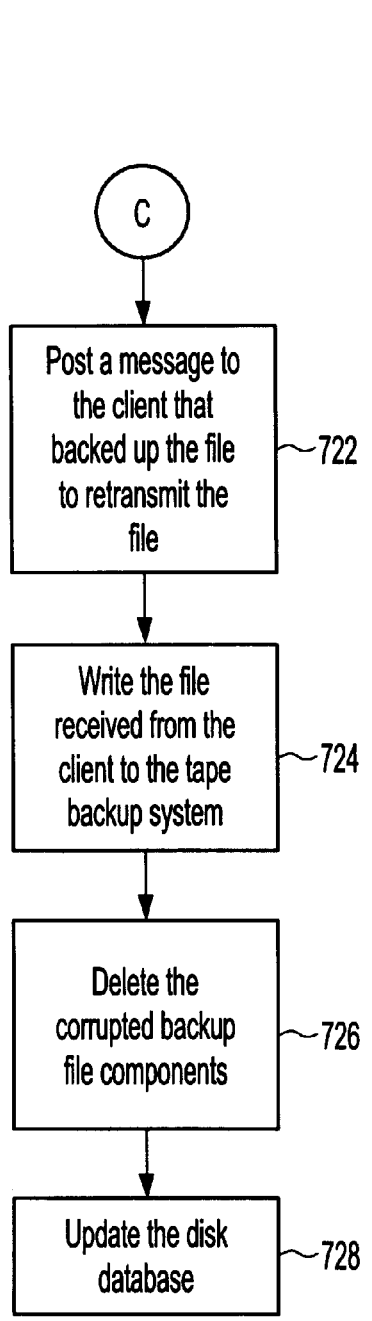

FIGS. 7A–7C illustrate a method for self-healing a differential backup system using the server to server resynchronization and client to server resynchronization processes described above. The server identifies the components of a backup file of interest, as illustrated in step 702, and reads data from the first memory device that includes the identified file components, as illustrated in step 704. The data read from the first memory device is written to the second memory device, as illustrated in step 706 and the server then reconstructs the most recent version of the backup file from the identified components, as illustrated in step 708. The reconstructed backup file is then checked to see if it properly reconstructed, as illustrated in step 710, and if the file is properly reconstructed, the server returns control to step 702 to select the next file.

If the file did not properly reconstruct control passes to step 712 and the server determines if a mirror server is used to store identical data. If a mirror server is used then a server to server resynchronization process (steps 714 to 720) is performed in which the server requests that the mirror server transmit the most recent version of the reconstructed backup file, as illustrated in step 714. The server receives the file from the mirror server and writes the received reconstructed backup file to the first memory device, as illustrated in step 716. The corrupted components of the backup file are deleted, as illustrated in step 718, and the disk database is updated as illustrated in step 720.

If a mirror server is not used, then a client to server resynchronization process (steps 722–728) is used to self-heal the backup file. Control passes to step 722 and the server posts a message to the client that backed up the data to retransmit the entire file to the server. The server receives the retransmitted file from the server and writes the entire file to the first memory device as a base file, as illustrated in step 724. The server then deletes the corrupted backup file components, as illustrated in step 726, and updates the disk database, as illustrated in step 728.

In an alternative embodiment, the above method for self-healing may be applied to a single memory file backup system as well. In this embodiment, the method would begin execution at step 708 and would continue to the appropriate end point, but at steps 716 or 724 the received reconstructed data would be written to the single memory device and not the tape drive.

Those of ordinary skill in the art should further appreciate that variations to and modification of the above-described methods and systems for administrating a differential backup system may be made without departing from the inventive concepts disclosed herein. Accordingly, the invention should be viewed as limited solely by the scope spirit of the appended claims.

What is claimed is:

1. A method for administration of a differential file backup system on a client-server system wherein the server includes a first memory storage device and a second memory device coupled thereto, and wherein a backup file comprises a plurality of component files that include a base file and at least one delta file, and wherein the base file and at least one delta file are stored on the first memory device in a first arrangement having a first number of access points on the first memory device, the method comprising the steps of:

reading, by the server from the first memory device, a first plurality of data including at least one base and at least one delta files;

writing, by the server to the second memory device, the first plurality of data;

processing, by the server the first plurality of data in the second memory device, to rearrange the first plurality of data into a second arrangement such that the plurality of components of the backup file have a second number of access points that are less than the first number of access points of the first arrangement; and writing, by the server to the first memory device, the first plurality of data in the second arrangement.

2. The method of claim 1, wherein the step of processing the first plurality of data includes:

reconfiguring the placement of the plurality of component files associated with the backup file wherein a subset of the plurality of component files are adjacent to one another when written to the first memory device.

3. The method of claim 1 wherein each file contained within the plurality of data includes a date indicative of the last change, the step of processing the first plurality of data includes:

reconfiguring the placement of the plurality of files contained within the plurality of data according to the date indicative of the last change.

4. The method of claim 1, wherein the delta file is one of a plurality of delta files, and wherein the step of processing the first plurality of data includes;

selecting from the plurality of component files associated with the backup file a base file and a subset of the plurality of delta files based on a predetermined criteria; and coalescing the selected base file and the subset of the plurality of delta files into a new base file.

5. The method of claim 4 wherein the step of selecting includes selecting the subset of the plurality of delta files according to one or more expiration rules.

6. The method of claim 5 wherein the step of selecting includes selecting the subset of the plurality of delta files according to one or more expiration rules that include a number of days beyond which as previously stored file is deleted.

7. The method of claim 6 wherein the step of selecting includes selecting the subset of the plurality of delta files that have exceeded the number of days beyond which files are deleted.

8. The method of claim 4 wherein the step of selecting includes selecting the subset of the plurality of delta files according to the predetermined criteria that includes the base file and the subsequent N delta files.

9. The method of claim 4 further including the steps of:
detecting if the coalesced file contains corrupted data;
in the event that the coalesced file contains corrupted data;
  posting, by the server, a message to the client that the coalesced file contains corrupted data;
  receiving by the client the posted message;
  searching by the client on a storage device coupled to the client, for an uncorrupted copy of the corrupted file contained on the server, that has a creation data at or later than the corrupted file on the server; and
  transferring by the client a copy of the uncorrupted file contained on a storage device coupled to the client, to the server.

10. The method of claim 4 wherein the step of coalescing includes:
determining a first size of the base file and the subset of the plurality of delta files to be coalesced;
estimating a second size of the new base file;
determining a difference in size between the first size and the second size;
in the event that the difference in size between the first size and the second size is greater than or equal to a predetermined threshold;
  coalescing the base file and the subset of the plurality of delta files; and
in the event that the difference in size between the first size and the second size is less than a predetermined threshold;
  not coalescing the base file and the subset of the plurality of delta files.

11. The method of claim 4 wherein the step of selecting includes selecting the base file and the subset of delta files using a file database accessible by the server.

12. A method for administration of a differential file back up system on a client-server system wherein the server includes a first memory storage device and a second memory device coupled thereto, the first memory device storing a plurality of archive files, each archive file storing at least a portion of a backup file, wherein the backup file comprises a plurality of component files that include a base file and at least one delta file, and wherein the plurality of component files associated with the backup file are stored in a first arrangement among one or more archive files, the first arrangement having a first number of access points associated with the backup file of interest on the first memory device, the method comprising the steps of:

selecting a subset of the plurality of archive files that contain one or more components of a backup file of interest;

reading, by the server, the selected archive files;

writing, by the server, the selected archive files into the second memory device;

processing, by the server, the components of the backup file of interest to enable the components of the backup file of interest to be arranged such that a second number of access points associated with the backup file of interest is less than the first number of access points associated with the backup file of interest; and writing, by the server, the processed components of the backup file of interest into a new archive file on the first memory device.

13. The method of claim 12 wherein the step of processing the first plurality of data includes:

rearranging the placement of the plurality of component files associated with the backup file wherein a subset of the plurality of component files are adjacent to one another and in the same archive file when written to the first memory device.

14. The method of claim 12 wherein the delta file is one of a plurality of delta files, and wherein the step of processing the components of the backup file of interest includes;

selecting from the plurality of component files associated with the backup file a base file and a subset of the plurality of delta files based on a predetermined criteria; and coalescing the selected base file and the subset of the plurality of delta files into a new base file.

15. The method of claim 14 wherein the step of selecting includes selecting the subset of the plurality of delta files according to one or more expiration rules.

16. The method of claim 15 wherein the step of selecting includes selecting the subset of the plurality of delta files according to one or more expiration rules that include a number of days beyond which as previously stored file is deleted.

17. The method, of claim 16 wherein the step of selecting includes selecting the subset of the plurality of delta files that have exceeded the number of days beyond which files are deleted.

18. The method of claim 14 wherein the step of selecting includes selecting the subset of the plurality of delta files according to the predetermined criteria that includes the base file and the subsequent N delta files.

19. The method of claim 14 further including the steps of:
detecting if the coalesced file contains corrupted data;
in the event that the coalesced file contains corrupted data;
  posting, by the server, a message to the client that the coalesced file contains corrupted data;
  receiving by the client the posted message;
  searching by the client on a storage device coupled to the client, for an uncorrupted copy of the corrupted file contained on the server, that has a creation data at or later than the corrupted file on the server; and transferring by the client a copy of the uncorrupted file contained on a storage device coupled to the client, to the server.

20. The method of claim 14 wherein the step of coalescing includes:
   determining a first size of the base file and the subset of the plurality of delta files to be coalesced;
   determining a second size of the new base file;
   estimating a difference in size between the first size and the second size;
   in the event that the difference in size between the first size and the second size is greater than or equal to a predetermined threshold;
      coalescing the base file and the subset of the plurality of delta files; and
   in the event that the difference in size between the first size and the second size is less than a predetermined threshold;
      not coalescing the base file and the subset of the plurality of delta files.

21. The method of claim 14 wherein the step of selecting includes selecting the base file and the subset of delta files using a file database accessible by the server.

22. The method of claim 12 wherein each file contained within the plurality of data includes a date indicative of the last change, the step of processing the first plurality of data includes:
   reconfiguring the placement of the plurality of files contained within each archive file according to the date indicative of the last change.

23. A method for self healing a differential file back up system on a client-server system wherein the server includes a first memory storage device and a second memory device coupled thereto, and wherein a backup file comprises a plurality of component files that include a base file having a first creation data and a plurality of delta files having a plurality of creation dates later than the first creation date, and wherein the base file and at least one delta file are stored on the first memory device in a first arrangement having a first number of access points on the first memory device, the method comprising the steps of:
   selecting a backup file of interest from the first memory device having a predetermined number of delta files after the creation date of the base file;
   reading from the first memory device, the components of the selected backup file of interest;
   writing the components of the selected backup file of interest to the second memory device;
   reconstructing by the server the most recent version of the backup file from the file components in the second memory device;
   detecting if the reconstruction failed;
   in the event that the reconstruction failed
      requesting the client retransmit the most recent version of the file corresponding of the backup file of interest;
      retransmitting by the client the most recent version of the file corresponding of the backup file of interest;
      receiving by the server the retransmitted file from the client;
      replacing the components of the selected backup file of interest in the second memory device with the received file; and
      writing the received file from the second memory device to the first memory device in place of the components of the selected backup file of interest.

24. A method for self healing a differential file back up system on a client-server system including a client, a first server, and a second server, wherein the first server includes a first memory storage device and a second memory device coupled thereto and the mirror server includes first and second memory devices coupled thereto, and wherein both the first and mirror server are coupled to one another and to the client, and wherein a backup file comprises a plurality of component files that include a base file having a first creation data and a plurality of delta files having a plurality of creation dates later than the first creation date, and wherein the base file and at least one delta file are stored on the first memory device in a first arrangement having a first number of access points on the first memory device of both the first server and the mirror server respectively, the method comprising the steps of:
   selecting a backup file of interest from the first memory device having a predetermined number of delta files after the creation date of the base file;
   reading from the first memory device, the components of the selected backup file of interest;
   writing the components of the selected backup file of interest to the second memory device;
   reconstructing by the server the most recent version of the backup file from the file components in the second memory device;
   detecting if the reconstruction failed;
   in the event that the reconstruction failed
      requesting the mirror server retransmit the most recent version of the file corresponding of the backup file of interest;
      retransmitting by the mirror server the most recent version of the file corresponding of the backup file of interest;
      receiving by the server the retransmitted file from the client;
      replacing the components of the selected backup file of interest in the second memory device with the received file; and
      writing the received file from the second memory device to the first memory device in place of the components of the selected backup file of interest.

25. A method for administration of a differential file back up system on a client-server system including a first server, a mirror server, and a client all coupled together, and wherein the first server and the mirror server both include a first memory storage device, a second memory device and a disk database coupled thereto, and wherein a backup file comprises a plurality of component files that include a base file and at least one delta file, and wherein each component file has a corresponding plurality of data stored within the disk database, and wherein the base file and at least one delta file are stored on the first memory device of both the first server and the mirror server in a first arrangement having a first number of access points on the first memory device, the method comprising the steps of:
   reading by the first server of the plurality of data contained within the disk database coupled thereto;
   reading by the mirror server of the plurality of data contained within the disk database coupled thereto;
   sorting by the first server the plurality of data according to a predetermined key;
   sorting by the mirror server the plurality of data according to a predetermined key;
   comparing the sorted plurality of data of the first server and the mirror server;

in the event that a component of a backup file is present on the mirror server and not on the first server, transmitting by the mirror server to the first server the missing component; and in the event that a component of a backup file is present on the first server and not on the mirror server, transmitting by the mirror server to the first server the missing component.

26. A method for administration of a differential file back up system on a client-server system wherein the server includes a first memory storage device and a second memory device coupled thereto, the first memory device storing a plurality of archive files, each archive file being associated with one of a plurality of accounts and each archive file storing at least a portion of a backup file associated with the one of the plurality of accounts, wherein the plurality of archive files are stored in a first arrangement and each of the plurality of accounts have a first number of access points associated therewith on the first memory device, the method comprising the steps of:

selecting a subset of the plurality of archive files that are associated with one or more accounts;

reading, by the server, the selected archive files;

writing, by the server, the selected archive files into the second memory device;

processing, by the server, the archive files to be arranged such that a second number of access points associated with the plurality of archive files associated with an account of interest is less than the first number of access points associated with account of interest; and writing, by the server, the processed plurality of archive files on the first memory device.

27. A method for administration of a differential file backup system on a client-server system wherein the server includes a memory storage device coupled thereto, and wherein a backup file comprises a plurality of component files that include a base file and at least one delta file, and wherein the base file and at least one delta file are stored on the memory device in a first arrangement having a first number of access points on the memory storage device, the method comprising the steps of:

reading, by the server from the memory storage device, a first plurality of data including at least one base and at least one delta files;

writing the first plurality of data to a temporary memory location;

processing, by the server the first plurality of data in the temporary memory location within the memory storage device, to rearrange the first plurality of data into a second arrangement such that the plurality of components of the backup file have a second number of access points that are less than the first number of access points of the first arrangement; and writing, by the server to the memory storage device, the first plurality of data in the second arrangement.

28. The method of claim 27 wherein the delta file is one of a plurality of delta files, and wherein the step of processing the first plurality of data includes;

selecting from the plurality of component files associated with the backup file a base file and a subset of the plurality of delta files based on a predetermined criteria; and coalescing the selected base file and the subset of the plurality of delta files into a new base file.

29. The method of claim 28 wherein the step of selecting includes selecting the subset of the plurality of delta files according to one or more expiration rules.

30. The method of claim 29 wherein the step of selecting includes selecting the subset of the plurality of delta files according to one or more expiration rules that include a number of days beyond which as previously stored file is deleted.

31. The method of claim 30 wherein the step of selecting includes selecting the subset of the plurality of delta files that have exceeded the number of days beyond which files are deleted.

32. The method of claim 30 wherein the step of selecting includes selecting the subset of the plurality of delta files according to the predetermined criteria that includes the base file and the subsequent N delta files.

33. The method of claim 30 further including the steps of:

detecting if the coalesced file contains corrupted data;

in the event that the coalesced file contains corrupted data;
posting, by the server, a massage to the client that the coalesced file contains corrupted data;
receiving by the client the posted message;
searching by the client on a storage device coupled to the client, for an uncorrupted copy of the corrupted file contained on the server, that has a creation data at or later than the corrupted file on the server; and
transferring by the client a copy of the uncorrupted file contained on a storage device coupled to the client, to the server.

34. The method of claim 30 wherein the step of coalescing includes:

determining a first size of the base file and the subset of the plurality of delta files to be coalesced;

estimating a second size of the new base file;

determining a difference in size between the first size and the second size;

in the event that the difference in size between the first size and the second size is greater than or equal to a predetermined threshold;
coalescing the base file and the subset of the plurality of delta files; and in the event that the difference in size between the first size and the second size is less than a predetermined threshold;
not coalescing the base file and the subset of the plurality of delta files.

35. The method of claim 30 wherein the step of selecting includes selecting the base file and the subset of delta files using a file database accessible by the server.

* * * * *

UNITED STATES PATENT AND TRADEMARK OFFICE
CERTIFICATE OF CORRECTION

PATENT NO. : 6,629,110 B2
DATED : September 30, 2003
INVENTOR(S) : David A. Cane et al.

It is certified that error appears in the above-identified patent and that said Letters Patent is hereby corrected as shown below:

Column 16,
Line 26, "massage" should read -- message --.

Signed and Sealed this

Ninth Day of November, 2004

JON W. DUDAS
*Director of the United States Patent and Trademark Office*